United States Patent [19]

Durand et al.

[11] Patent Number: 5,366,649

[45] Date of Patent: Nov. 22, 1994

[54] COPOLYMERS USABLE AS MULTIFUNCTIONAL ADDITIVES FOR LUBRICANTS AND LUBRICATING COMPOSITIONS CONTAINING SAID COPOLYMERS

[75] Inventors: Jean-Pierre Durand, Chatou; Catherine Keromest, Rouen; Maurice Born, Nanterre, all of France

[73] Assignee: Institut Francais du Petrole, Rueil-Malmaison, France

[21] Appl. No.: 76,680

[22] Filed: Jun. 15, 1993

[30] Foreign Application Priority Data

Jun. 16, 1992 [FR] France ................... 92 07395

[51] Int. Cl.$^5$ ............... C10M 157/08; C10M 157/06; C08F 220/38
[52] U.S. Cl. .................. 252/46.6; 252/46.4; 525/327.5; 525/341
[58] Field of Search .............. 252/46.6, 46.4; 525/331.8, 341, 327.5

[56] References Cited

U.S. PATENT DOCUMENTS

| | | |
|---|---|---|
| 3,070,581 | 12/1962 | Miller ..................... 260/79.5 |
| 4,152,275 | 5/1979 | Horodysky et al. ........... 252/46.6 |
| 4,207,195 | 6/1980 | Horodysky .................. 252/46.6 |
| 4,376,054 | 3/1983 | Zinke ....................... 252/46.7 |
| 4,435,338 | 3/1984 | Michaelis et al. ........... 252/46.6 |
| 4,502,972 | 3/1985 | Davis et al. ............... 252/47 |
| 4,766,228 | 8/1988 | Born et al. ................ 252/46.4 |
| 4,882,446 | 11/1989 | Born et al. ................ 252/46.4 |

FOREIGN PATENT DOCUMENTS 1256452 12/1971 United Kingdom .
2043654 10/1980 United Kingdom .

*Primary Examiner*—Prince Willis, Jr.
*Assistant Examiner*—James M. Silbermann
*Attorney, Agent, or Firm*—Millen, White, Zelano & Branigan

[57] ABSTRACT

Modified copolymers usable as additives for lubricants and having antiwear and viscosity index-improving properties are prepared by the modification of ethylene-propylene copolymers or ethylene-propylene-diene terpolymers in such a was as to fix the sulphur and phosphorus. Such modified copolymers contain 0.2 to 2% phosphorus, and 0.4 to 4% sulphur and are used in a lubricating composition at a rate of 0.25 to 10%.

11 Claims, No Drawings

COPOLYMERS USABLE AS MULTIFUNCTIONAL ADDITIVES FOR LUBRICANTS AND LUBRICATING COMPOSITIONS CONTAINING SAID COPOLYMERS

BACKGROUND OF THE INVENTION

The invention relates to modified copolymers and terpolymers more particularly usable as multifunctional additives for lubricants. They have antiwear and viscosity index-improving properties.

The basic copolymers and terpolymers consist of ethylene-propylene copolymers and ethylene-propylene-diene terpolymers (EPDM copolymers). According to the invention, they are modified so as to fix sulphur and phosporus.

Ethylene-propylene copolymers and ethylene-propylene-diene terpolymers have long been used for improving the viscosity of lubricating oils. They are prepared by the copolymerization of ethylene and propylene and optionally an unconjugated diene, which can be dicyclopentadiene, 1,4-hexadiene or ethylidene-norbornene, usually followed by a mechanical degradation stage so as to obtain a copolymer having an appropriate molecular weight.

Copolymers modified so as to simultaneously permit the improvement of the viscosity index of lubricating oils and the dispersion of the residues which they are liable to contain in use have already been proposed. Such copolymers are generally obtained by modifying ethylene-propylene copolymers either by grafting nitrogenous dispersant monomers, or by maleinization and reaction with polyamines and/or polyols. The preparation and use of such additives are more particularly described in U.S. Pat. Nos. 4,092,255, 4,146,489, 4,170,561 and 4,175,975, EP-A-225,048 and 4,144,181.

Copolymers or terpolymers modified so as to simultaneously make it possible to improve the viscosity index, disperse residues and provide antioxidant protection have also been proposed. The preparation and use of such additives are more particularly described in U.S. Pat. Nos. 4,668,412, 4,904,404, 4,863,623 and 4,798,678.

In addition, U.S. Pat. No. 4,502,972 describes the preparation and use as an additive for lubricants a polymer obtained by the treatment of an ethylene-propylene-diene terpolymer with chlorine, followed by a reaction with a sodium N,N-dialkyldithiocarbamate.

In general terms, the use of multifunctional additives makes it possible to avoid problems of compatibility of the additives, simplifies the formulation of the lubricating compositions and leads to improved performance characteristics.

SUMMARY OF THE INVENTION

Therefore the invention proposes novel copolymers more particularly usable as multifunctional additives in lubricants and which have improved properties with respect to this use.

The copolymers according to the invention, more particularly usable as multifunctional additives in lubricants, can be defined in general terms as being obtained by the chemical modification of ethylene-propylene copolymers or ethylene-propylene-unconjugated diene terpolymers, so as to fix groups containing sulphur and phosphorus.

The polyolefin copolymers used for such a modification in the present invention have an ethylene content between 40 and 70 mole % and a number average molecular weight between 30,000 and 120,000 with a polydispersity index $\overline{M}_p/\overline{M}_n$ of approximately 1.5 to 5. Such products can be prepared either directly by polymerization, or by the controlled thermal and/or mechanical degradation of copolymers having higher molecular weights.

The modified copolymers according to the invention are obtained by all methods making it possible to implant sulphur and phosphorus on the envisaged polyolefin substrate. Usually and according to a preferred operating procedure, the polyolefin copolymers are functionalized by the fixing of groups such as acid, anhydride, epoxide, etc., prior to modification by phosphorosulphur compounds.

For example, the implantation of anhydride groups can be brought about by the reaction of ethylene-propylene copolymers or ethylene-propylene-diene terpolymers with maleic anhydride in solution or mass, either thermally or in the presence of radial initiators, under previously described conditions.

The implantation of epoxide groups can be brought about either by grafting unsaturated monomers containing an epoxy group such as e.g. glycidyl acrylate or methacrylate, on ethylene-propylene copolymers or on ethylene-propylene-diene terpolymers, or by epoxidation of ethylene-propylene-diene copolymers.

The phosphorosulphur compounds able to react on copolymers or terpolymers functionalized by anhydride groups are more particularly phosphorosulphur alcohols in accordance with the general formula:

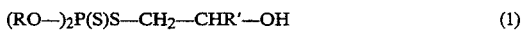

$$(RO-)_2P(S)S-CH_2-CHR'-OH \qquad (1)$$

or the general formula:

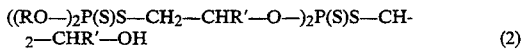

$$((RO-)_2P(S)S-CH_2-CHR'-O-)_2P(S)S-CH_2-CHR'-OH \qquad (2)$$

in which R represents an alkyl radial e.g. containing 1 to 30 carbon atoms and R' represents a hydrogen atom or an alkyl radical e.g. containing 1 to 30 carbon atoms.

In addition, the phosphorosulphur compounds able to react on copolymers or terpolymers functionalized by epoxy groups are more particularly phosphorosulphur acids in accordance with the general formula:

$$(RO-)_2P(S)SH \qquad (3)$$

or the general formula:

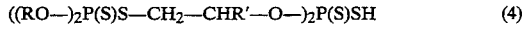

$$((RO-)_2P(S)S-CH_2-CHR'-O-)_2P(S)SH \qquad (4)$$

in which R and R' have in each case the meanings given for formulas (1) and (2).

Phosphorosulphur acids (dialkyldithiophosphoric acids) of general formula (3) can be prepared by the reaction of primary or secondary alcohols ROH or alkyl phenols R—Ar—OH with diphosphorus pentasulphide ($P_2S_5$ or $P_4S_{10}$).

The phosphorosulphur alcohols of general formula (10 can be prepared by reacting an acid of general formula (3) with an epoxide compound

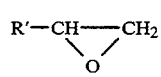

(which is e.g. ethylene oxide when R' represents a hydrogen atom.

The phosphorosulphur acids of general formula (4) ("dialkyldithiophosphyldithiophosphoric" acids) can be prepared from alcohols of general formula (1) by reacting thereon diphosphorus pentasulphide ($P_2S_5$ or $P_4S_{10}$).

Finally, the phosphorosulphur alcohols of general formula (2) can be prepared by reacting an acid of general formula (4) with an epoxide compound

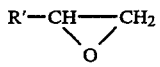

(which is e.g. ethylene oxide when R' represents a hydrogen atom).

The preparation methods which can be used are well known from the prior art and descriptions thereof are in particular provided in the Applicant's U.S. Pat. Nos. 4,766,228 and 4,882,446.

In practice, in order to prepare the modified copolymers and terpolymers according to the invention from maleinized copolymers or terpolymers (i.e. having units derived from maleic anhydride), use is preferably made of phosphorosulphur alcohols complying with formula (1) or (2), in which R more particularly represents an isopropyl radical and R' more particularly represents a hydrogen atom. The phosphorosulphur alcohol is then reacted with said maleinized copolymer or terpolymer in a solvent, such as e.g. toluene, at a temperature generally between 40° and 130° C. and preferably between 80° and 120° C.

In the case where the modified copolymers according to the invention are obtained from copolymers containing epoxide groups, the reaction between such copolymers and the phosphorosulphur acid according to formula (3) or (4) will take place in a solvent such as toluene or xylene at a temperature between 20° and 60° C. and preferably between 30° and 50° C.

The modified copolymers and terpolymers according to the invention generally have a phosphorus content between 0.2 and 2% by weight and a sulphur content between 0.4 and 4% by weight.

In their use as multifunctional additives in lubricating oils (both mineral and synthetic), they are added to the oils in concentrations generally between 0.25 and 10% by weight and preferably between 0.5 and 5% by weight. The thus formed lubricating compositions generally contain between 10 and 10,000 ppm and preferably between 50 and 500 ppm of phosphorus.

The following examples illustrate the invention, but in no way limit its scope. Formulations A and C of example 4 have been tested for comparison purposes.

EXAMPLES

Example 1

Into a 1 liter reactor equipped with a stirring system, a condenser and a nitrogen flow, are introduced 30 g of maleinized ethylene-propylene copolymer dissolved in 300 g of toluene. The characteristics of the copolymer used are:

ethylene content: 53 mole %
anhydride index: 0.06 anhydride equivalent/100 g
number average molecular weight $\overline{M}_n$: 48,00
($\overline{M}_p/\overline{M}_n = 2.5$)

To this mixture are added 32.5 g of diisopropyldithiophosphoric alcohol and the reaction solution is heated at toluene reflux for 70 hours. The modified copolymer is isolated by precipitation in the acetone of the reaction mixture from which ⅔ of the toluene has been eliminated beforehand by evaporation under reduced pressure.

After acetone washing operations, followed by drying, a modified ethylene-propylene copolymer is obtained containing 1.16% by weight phosphorus and 2.55% by weight sulphur.

Example 2

If in example 1, everything else being equal, the duration of the reaction is limited to 24 hours, a modified copolymer containing 0.9% by weight phosphorus and 1.82% by weight sulphur is obtained.

Example 3

If in example 1, everything else being equal, 4.8 g of diisopropyldithiophosphoric alcohol is added in place of 30 g, after 40 hours reaction a modified ethylene-propylene copolymer is obtained, which contains 0.89% by weight phosphorus and 1.86% by weight sulphur.

Example 4

In this example, the antiwear and extreme pressure power of lubricating compositions containing as the basic oil a 175N mineral oil and as the viscosity index-improving additive the modified copolymers of examples 1 and 2 was evaluated in comparison with that of a lubricating composition based on 175N mineral oil and containing as the viscosity index-improver the ethylene-propylene copolymer used for the preparation of the modified copolymer in example 1 and as the antiwear additive the presently used zinc dialkyldithiophosphate. The concentration of the additives in the different lubricating compositions prepared was chosen so as to obtain formulations having the same viscosity and the same sulphur and phosphorus contents. The evaluation of the antiwear and extreme pressure properties of these lubricating compositions took place with the aid of the SHELL four-ball machine under the conditions of the three following standardized tests: ASTM D 2783, NFE 48-617 and PEUGEOT SA/RENAULT D55 1 136. The composition of the different formulations considered and the performance characteristics obtained are given in table 1, which clearly shows the improvement of the antiwear and extreme pressure properties resulting from the use of the modified copolymers according to the invention.

TABLE 1

| FORMULATIONS | A | B | C | D | E |
| --- | --- | --- | --- | --- | --- |
| 175 N mineral oil (wt. %) | 100 | 98 | 97.8 | 98 | 98 |
| copolymer EP[a] (wt. %) | 0 | 0 | 2 | 1 | 0 |
| cppolymer Ex. 1[b] (wt. %) | 0 | 2 | 0 | 1 | 0 |
| copolymer Ex. 2[c] (wt. %) | 0 | 0 | 0 | 0 | 2 |
| additive[d] (wt. %) | 0 | 0 | 0.2 | 0 | 0 |
| P content (ppm) | 0 | 227 | 193 | 115 | 180 |
| Viscosity at 100° C. (mm²/s) | | 13 | 12.2 | | 12.6 |

TABLE 1-continued

| FORMULATIONS | A | B | C | D | E |
|---|---|---|---|---|---|
| Extreme pressure tests: ASTM standard D 2783 | | | | | |
| Pre-seizing charge (kg) | 40 | 100 | 100 | 100 | 100 |
|  | (392.4 N) | (981 N) | (981 N) | (981 N) | (981 N) |
| Welding charge (kg) | 126 | 220 | 220 | 210 | 220 |
|  | (1236 N) | (2158 N) | (2158 N) | (2060 N) | (2158 N) |
| ICU (kg) | 17.6 | 43.5 | 44 | 43.5 | 44 |
|  | (172,6 N) | (426.7 N) | (431.6 N) | (426.7 N) | (431.6 N) |
| Antiwear tests: NF E 48 617 | Impression diameter (mm) after 1 h under load of: | | | | |
| 40 kg (392.4 N) | 0.93 | 0.47 | 0.76 | 0.42 | 0.46 |
| 60 kg (588.6 N) | 1.99 | 0.56 | 1.85 | 0.77 | 0.57 |
| 80 kg (784.8 N) | 2.30 | 0.78 | 2.18 | 2.24 | 0.80 |
| Peugeot SA/Renault D55 1136 Tests | | | | | |
| Pre-seizing charge (kg) |  | 110 | 70 | 100 | 110 |
|  |  | (1079 N) | (686.7 N) | (981 N) | (1079 N) |
| Point A (kg) |  | 120 | 80 | 90 | 120 |
|  |  | (1177 N) | (784.8 N) | (882.9 N) | (1177 N) |

(a)Unmodified ethylene-propylene copolymer (ethylene: 53 mole %, $\overline{M}_p$ = 120,000 and $\overline{M}_p/\overline{M}_n$ = 2.5)
(b)Modified copolymer prepared in example 1.
(c)Modified copolymer prepared in example 2.
(d)Commercial zinc dialkyldithiophosphate (P:9.2 wt. %)

We claim:

1. A polyolefin copolymer usable as a multifunctional additive for lubricants, comprising a polyolefin copolymer based on ethylene, propylene and optionally an unconjugated diene, modified so as to contain sulphur and phosphorus, said copolymer being obtained by the esterification of an ethylene-propylene copolymer or an ethylene-propylene-diene terpolymer containing fixed succinic anhydride groups, with a phosphorosulphur alcohol of the formula:

$$(RO{-})_2P(S)S{-}CH_2{-}CHR'{-}OH \quad (1)$$

or the formula:

$$((RO{-})_2P(S)S{-}CH_2{-}CHR'{-}O{-})_2P(S)S{-}CH_2{-}CHR'{-}OH \quad (2)$$

in which R represents an alkyl radical containing 1 to 30 carbon atoms and R' represents a hydrogen atom or an alkyl radical containing 1 to 30 carbon atoms.

2. A copolymer according to claim 1, obtained from a copolymer based on ethylene, propylene and optionally diene, whose ethylene content is between 40 and 70 mole % and whose number average molecular weight is between 30,000 and 120,000, the polydispersity index being 1.5 to 5.

3. A copolymer according to claim 1, wherein in the formulas (1) and (2), R is an isopropyl radical and R' is a hydrogen atom.

4. A copolymer according to claim 1, having a phosphorus and sulphur content respectively between 0.2 and 2% by weight and 0.4 and 4% by weight.

5. A lubricating composition, comprising a major proportion of lubricating oil having a mineral or synthetic origin and, as an additive, a proportion of 0.25 to 10% by weight of at least one copolymer according to claim 1.

6. A lubricating composition according to claim 5, wherein said copolymer proportion is 0.5 to 5% by weight.

7. A lubricating composition according to claim 5, comprising 10 to 10,000 ppm of phosphorus from said copolymer.

8. A lubricating composition according to claim 7, wherein the phosphorus proportion from said copolymer is 50 to 550 ppm.

9. A copolymer according to claim 1, wherein the phosphorosulphur alcohol is $$(RO{-})_2P(S)S{-}CH_2{-}CHR'{-}OH \quad (1).$$

10. A copolymer according to claim 1, wherein the phosphorosulphur alcohol is $$((RO{-})_2P(S)S{-}CH_2{-}CHR'{-}O{-})_2P(S)S{-}CH_2{-}CHR'{-}OH \quad (2).$$

11. A copolymer according to claim 1, wherein the phosphorosulphur alcohol is diisopropyldithiophosphoric alcohol.

* * * * *